US012208465B2

(12) United States Patent
Beckett et al.

(10) Patent No.: US 12,208,465 B2
(45) Date of Patent: Jan. 28, 2025

(54) OPTICAL FILTER HAVING DUAL POLARIZATION

(71) Applicant: DIVERGENT TECHNOLOGIES, INC., Los Angeles, CA (US)

(72) Inventors: Darren Beckett, Corrales, NM (US); Martin S. Piltch, Los Alamos, NM (US); Scott Betts, Albuquerque, NM (US); Alberto M. Castro, Santa Fe, NM (US); Kevin Anderson, Albuquerque, NM (US); Lars Jacquemetton, Santa Fe, NM (US); Luis Aguilar, Santa Fe, NM (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 367 days.

(21) Appl. No.: 17/091,644

(22) Filed: Nov. 6, 2020

(65) Prior Publication Data
US 2021/0138578 A1 May 13, 2021

Related U.S. Application Data

(60) Provisional application No. 62/933,154, filed on Nov. 8, 2019.

(51) Int. Cl.
*B23K 26/03* (2006.01)
*B23K 26/082* (2014.01)
*B23K 26/342* (2014.01)
*B33Y 10/00* (2015.01)
(Continued)

(52) U.S. Cl.
CPC .......... *B23K 26/032* (2013.01); *B23K 26/082* (2015.10); *B33Y 10/00* (2014.12);
(Continued)

(58) Field of Classification Search
CPC .......... B22F 10/28; B22F 10/85; B22F 12/90; B23K 26/032; B23K 26/082;
(Continued)

(56) References Cited

U.S. PATENT DOCUMENTS 9,925,715 B2 * 3/2018 Cheverton ............. B33Y 10/00
9,977,425 B1 5/2018 McCann et al.
(Continued)

FOREIGN PATENT DOCUMENTS

CN 1172210 C 10/2004
CN 106338521 A 1/2017
(Continued)

OTHER PUBLICATIONS

PCT/US2020/059438, "International Preliminary Report on Patentability", May 19, 2022, 7 pages.
(Continued)

*Primary Examiner* — Dana Ross
*Assistant Examiner* — Adam M Eckardt
(74) *Attorney, Agent, or Firm* — FisherBroyles, LLP

(57) ABSTRACT

An additive manufacturing system comprises a build plane and an energy source configured to direct energy onto a work region of the build plane. An optical detector is configured to receive one or more optical signals from the work region. An optical filter is positioned between the work region and the optical detector, wherein the optical filter includes a first partially transmissive polarized filter having a first polarization axis and a second partially transmissive polarized filter having a second polarization axis. The first polarization axis is rotationally offset from the second polarization axis approximately 90 degrees. The optical filter improves the signal to noise ratio of the optical sensors.

16 Claims, 4 Drawing Sheets

(51) Int. Cl.
  *B33Y 30/00* (2015.01)
  *B33Y 50/02* (2015.01)
  *G02B 5/30* (2006.01)
  *G02B 27/28* (2006.01)

(52) U.S. Cl.
  CPC ............... *B33Y 30/00* (2014.12); *B33Y 50/02* (2014.12); *G02B 5/3025* (2013.01); *G02B 27/281* (2013.01); *B23K 26/342* (2015.10)

(58) Field of Classification Search
  CPC ...... B23K 26/342; B23K 26/03; B33Y 10/00; B33Y 30/00; B33Y 50/02; B33Y 50/00; G02B 27/281; G02B 5/3025; G02B 27/28; G02B 5/30; Y02P 10/25; B29C 64/386; B29C 64/393; B29C 64/379; B29C 67/0088; G06F 3/1237; G05B 15/02

See application file for complete search history.

(56) References Cited

U.S. PATENT DOCUMENTS

| | | | |
|---|---|---|---|
| 10,254,754 | B2 | 4/2019 | McCann et al. |
| 10,705,509 | B2 | 7/2020 | Snyder et al. |
| 10,725,459 | B2 | 7/2020 | Good et al. |
| 2006/0056029 | A1* | 3/2006 | Ye .............................. G02F 1/09 359/578 |
| 2010/0309555 | A1* | 12/2010 | Southwell .............. G02B 5/281 359/586 |
| 2011/0001812 | A1 | 1/2011 | Kang et al. |
| 2013/0305357 | A1 | 11/2013 | Ayyagari et al. |
| 2014/0265046 | A1 | 9/2014 | Burris et al. |
| 2014/0369678 | A1* | 12/2014 | Yang ................ H04B 10/07953 398/26 |
| 2015/0170501 | A1 | 6/2015 | Mukherji et al. |
| 2016/0302148 | A1 | 10/2016 | Buck et al. |

FOREIGN PATENT DOCUMENTS

| | | |
|---|---|---|
| EP | 3070554 B1 | 2/2018 |
| JP | 2001021842 A | 1/2001 |
| JP | 2011002240 A | 1/2011 |
| JP | 6233180 B2 | 11/2017 |

OTHER PUBLICATIONS

PCT/US2020/059438, "International Search Report and Written Opinion", Feb. 26, 2021, 11 pages.

* cited by examiner

OPTICAL FILTER HAVING DUAL POLARIZATION

CROSS-REFERENCES TO OTHER APPLICATIONS

This application claims priority to U.S. provisional patent application Ser. No. 62/933,154, for "REJECTION OF SPURIOUS LIGHT" filed on Nov. 8, 2019 which is hereby incorporated by reference in entirety for all purposes.

BACKGROUND OF THE INVENTION

Additive manufacturing, or the sequential assembly or construction of a part through the combination of material addition and applied energy, takes on many forms and currently exists in numerous implementations and embodiments. Additive manufacturing can be carried out by using any of a number of various processes that involve the formation of a three dimensional part of virtually any shape. The various processes have in common the sintering, curing or melting of liquid, powdered or granular raw material, layer by layer using ultraviolet light, high powered laser, or electron beam, respectively. During the manufacturing process optical noise is generated in the form of spurious light emissions and mixed light signal polarizations resulting in impaired fidelity of the sensing and control systems.

SUMMARY

In some embodiments an additive manufacturing system comprises a build plane and an energy source configured to direct energy onto a work region of the build plane. An optical detector is configured to receive one or more optical signals from the work region. An optical filter is positioned between the work region and the optical detector, wherein the optical filter includes a first partially transmissive polarized filter having a first polarization axis and a second partially transmissive polarized filter having a second polarization axis, wherein the first polarization axis is rotationally offset from the second polarization axis. In various embodiments the first partially transmissive polarized filter allows the optical signals having an electric field not aligned with the first polarization axis to pass through with between 20 percent and 80 percent transmittance, and further, the second partially transmissive polarized filter allows the optical signals having an electric field not aligned with the second polarization axis to pass through with between 20 percent and 80 percent transmittance.

In some embodiments the first partially transmissive polarized filter allows the optical signals having an electric field not aligned with the first polarization axis to pass through with between 45 percent and 55 percent transmittance, and further, the second partially transmissive polarized filter allows the optical signals having an electric field not aligned with the second polarization axis to pass through with between 45 percent and 55 percent transmittance. In various embodiments the first and second partially transmissive polarized filters each have a transmittance ratio that is between 1.5 and 2.5. In some embodiments the first polarization axis is substantially perpendicular to the second polarization axis. In some embodiments the rotational offset between the first polarization axis and the second polarization axis is between 80 degrees and 110 degrees.

In some embodiments the additive manufacturing method comprises scanning an energy source along a first path traversing a layer of powder disposed on a build plane and receiving one or more optical signals from the build plane during the scanning. The one or more optical signals are filtered sequentially using a first polarized filter having a first polarization axis and a second polarized filter having a second polarization axis wherein the first polarization axis is rotated relative to the second polarization axis. The one or more optical signals are analyzed after the filtering using an optical sensor. The first polarization axis is rotated between 80 degrees and 110 degrees relative to the second polarization axis.

In some embodiments the first polarized filter allows between 40 percent and 70 percent of an incident intensity of the one or more optical signals to pass through that have a polarization direction that is not aligned with the first polarization axis. In various embodiments the first polarized filter has a transmittance ratio that is between 1.5 and 2.5. In some embodiments the second polarized filter allows between 40 percent and 70 percent of an incident intensity of the one or more optical signals to pass through that have a polarization direction that is not aligned with the second polarization axis. In some embodiments the second polarized filter has a transmittance ratio that is between 1.5 and 2.5. In various embodiments the one or more optical signals are selectively filtered with a bandpass filter before the filtering.

In some embodiments an optical system comprises a receiving aperture configured to receive one or more optical signals and an optical filter arranged to filter the one or more optical signals received through the receiving aperture. The optical filter includes a first polarized filter having a first polarization axis and a second polarized filter having a second polarization axis. The first polarization axis is rotationally offset from the second polarization axis and the first and the second polarization filters are arranged to sequentially filter the one or more received optical signals. An optical sensor is configured to generate one or more sensor readings in response to receiving the filtered one or more optical signals.

In some embodiments the first polarization axis is rotationally offset from the second polarization axis between 80 degrees and 110 degrees. In various embodiments the first polarized filter allows between 40 percent and 70 percent of an incident intensity of the one or more received optical signals to pass through that have a polarization direction that is not aligned with the first polarization axis. In some embodiments the first polarized filter has a transmittance ratio that is between 1.5 and 2.5. In various embodiments the second polarized filter allows between 40 percent and 70 percent of an incident intensity of the one or more received optical signals to pass through that have a polarization direction that is not aligned with the second polarization axis. In some embodiments the second polarized filter has a transmittance ratio that is between 1.5 and 2.5. In some embodiments the optical filter further comprises a bandpass filter.

Numerous benefits are achieved by way of the present invention over conventional techniques. For example, embodiments of the present invention provide the ability to increase SNR performance of optical sensors. The improved SNR enables more accurate sensing of the process parameters and more accurate control of the fabrication process.

DETAILED DESCRIPTION

Techniques disclosed herein relate generally to systems that receive and/or process optical signals. More specifically, techniques disclosed herein relate to the use of a dual polarization optical filter to improve the signal to noise ratio (SNR) of optical signals. In some instances, embodiments of the disclosure are particularly well suited for use with additive manufacturing systems because of the relatively high noise level and the stochastic nature of the optical signals, as described in more detail below.

For example, in some embodiments an additive manufacturing system employs a laser energy source to melt and fuse a work region of metallic powder. An optical sensor receives light emitted from the melt pool and laser plume. The received light can be stochastic in nature and may include both spurious signals as well as mixed polarizations. The received light is passed through a first partially transmissive polarization filter having a first polarization axis and through a second partially transmissive polarization having a second polarization axis, where the second axis is orthogonal to the first polarization axis.

In order to better appreciate the features and aspects of the present disclosure, further context for the disclosure is provided in the following section by discussing one particular implementation of an additive manufacturing system that includes a dual polarization filter according to embodiments of the disclosure. These embodiments are for explanatory purposes only and such filters can be employed in other systems and configurations. One of skill in the art with the benefit of this disclosure will appreciate that the dual polarizing filter is not limited to laser-based additive manufacturing processes. Other optical systems can employ similar techniques to improve the SNR of optical sensors including, but not limited to, optical communications systems, electron beam-based systems and UV curing-based systems.

Figure 1:
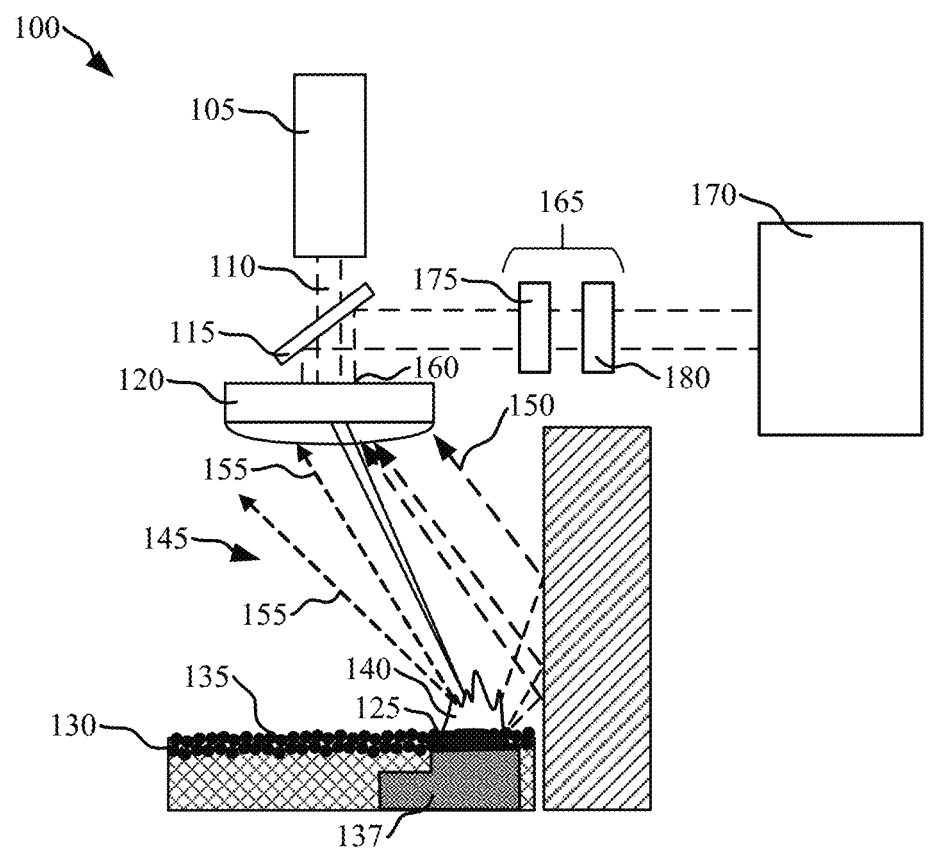
FIG. 1 is a simplified side view of an additive manufacturing system that includes a dual polarization optical filter, according to an embodiment of the disclosure.

FIG. 1 shows an example embodiment of an additive manufacturing system 100, according to embodiments of the disclosure. As shown in FIG. 1, additive manufacturing system 100 includes an energy source 105, which in this example is a laser, although energy source 105 could alternately take the form of an electron beam or other energy source. Beam 110 emitted by energy source 105 passes through a partially reflective optic 115. Partially reflective optic 115 is designed to be transmissive at the specific wavelength that energy source 105 operates, and reflective at other optical wavelengths. In some embodiments the laser wavelength is infrared or near-infrared and in various embodiments is typically wavelengths of 1000 nanometers or greater.

System 100 can include a scanning head 120 that consists of x and y positioning galvanometers as well as a focus lens, such as an f-theta lens to manipulate beam 110. Beam 110 can be focused and strikes a work region 125 of a build plane 130 that is covered with a layer of metallic powder 135. Beam 110 imparts thermal energy to work region 125 creating a molten pool of metal that is fused to an underlying part 137. As beam 110 is moved across build plane 130 by scanning head 120, selective portions of build plane 130 are fused to underlying portions of part 137 to create a layer of the part. Once each layer has been fused to the underlying part 137, a new layer of metal powder 135 is deposited on build plane 130 and beam 110 fuses the new layer to the underlying part in a sequential fashion until the part is completed.

As further shown in FIG. 1, the molten pool creates a luminous plume 140 that emits optical radiation 145. Optical radiation 145 can be stochastic in nature and may include both spurious signals 150 reflected off adjacent surfaces (e.g., metal powder 135 and features of system 100) as well as light having mixed polarizations 155. The presence of the elemental constituents of metal powder 135 can emit unique spectroscopic signatures from luminous plume 140 that issue from the heated and vaporized metal powder 135. A portion of optical radiation 145 enters a receiving aperture 160 in scanning head 103 and is reflected by partially reflective optic 115 through optical filter 165 and into an optical detector 170.

In some embodiments optical filter 165 includes a dual polarization filter that includes a first partially transmissive filter 175 having a first polarization axis and a second partially transmissive filter 180 having a second polarization axis wherein the first polarization axis is rotationally offset from the second polarization axis by 90 degrees. In some embodiments optical filter 165 improves a SNR of the optical signal received by optical detector 170 to improve an accuracy of the optical detector, as described in more detail below.

Figure 2:
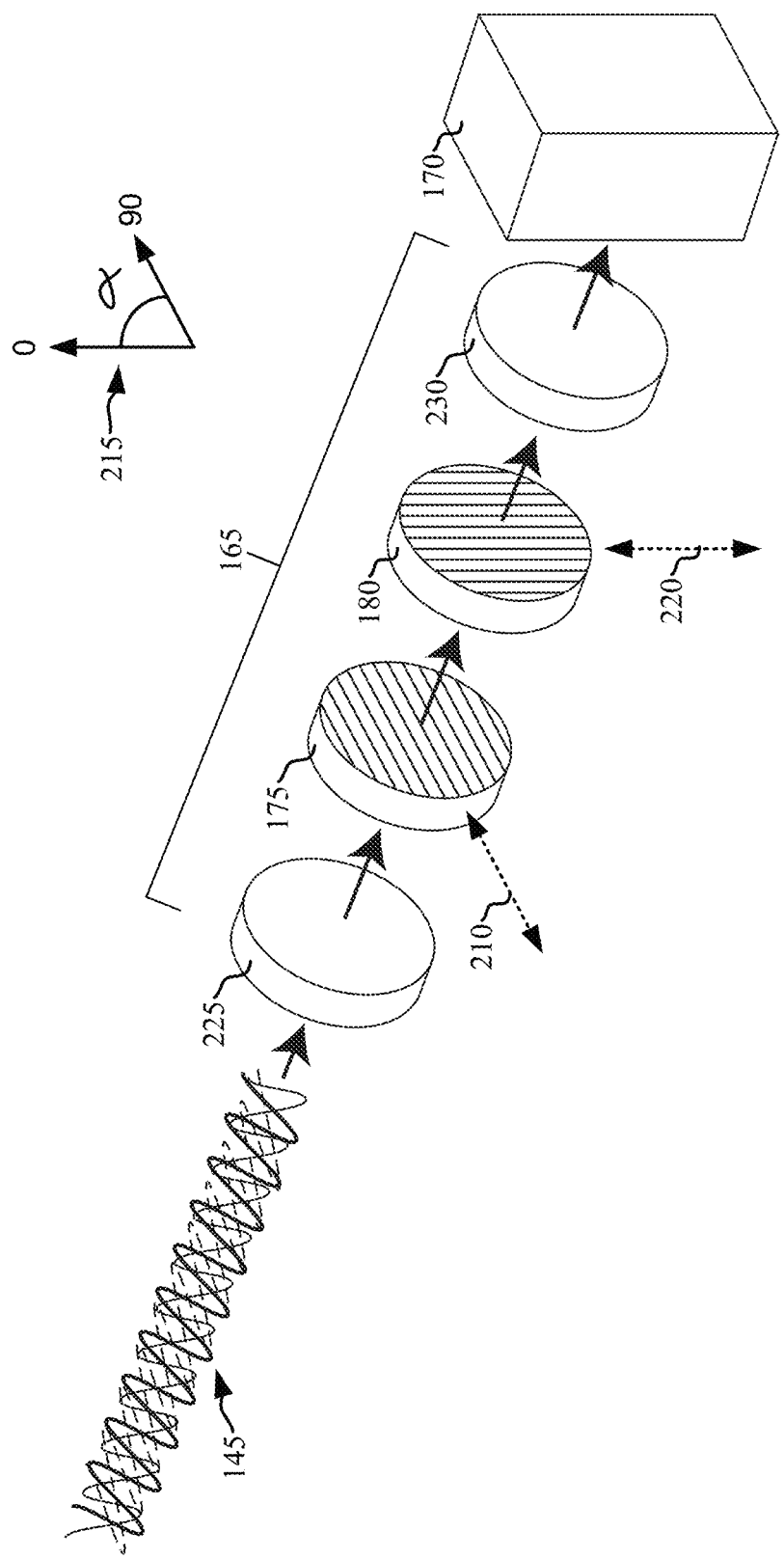
FIG. 2 is an exploded perspective view of the dual polarization optical filter shown in FIG. 1.

FIG. 2 is an exploded view of optical filter 165 and optical detector 170 of additive manufacturing system 100 illustrated in FIG. 1. As shown in FIG. 2, reflected optical radiation 145 is passed through optical filter 165 before being received by optical detector 170. Optical filter 165 includes first partially transmissive polarized filter 175 having a first polarization axis 210 that is oriented at 90 degrees as shown by coordinate system 215. As described herein, a polarization axis is the direction along which a filter passes an electric field of an incident electromagnetic wave. Thus, light signals having an electric field aligned with first polarization axis 210 will pass through with a high transmittance and light signals having an electric field not aligned with the first polarization axis will be attenuated to some degree. In some embodiments first partially transmissive filter 175 allows light signals having an electric field aligned with first polarization axis 210 to pass through with at least 90 percent transmittance (e.g., with less than 10 percent attenuation) and in some embodiments with at least 95 percent transmittance and in one embodiment with at least 99 percent transmittance.

Light signals having an electric field not aligned with first polarization axis 210 will pass through with a relatively lower transmittance (e.g., a greater attenuation) as compared to those that are aligned with the first polarization axis. In some embodiments first partially transmissive polarized filter 175 allows light signals having an electric field not aligned with first polarization axis 210 to pass through with between 20 percent to 80 percent transmittance (e.g., with between 80 percent to 20 percent attenuation, respectively) and in some embodiments with between at between 40 percent to 70 percent transmittance and in one embodiment with between 45 percent to 55 percent transmittance. Thus, first partially transmissive filter 175 has a higher transmittance for on-axis light than it does for off-axis light.

In one embodiment a transmittance ratio for each of first and second partially transmissive polarized filters 175, 180, respectively can be defined herein as a ratio of on-axis transmittance to off-axis transmittance of incident light. In one embodiment each of first and second partially transmissive polarized filters 175, 180, respectively, have a transmittance ratio between 1.5 and 2.5 and in various embodiments the transmittance ratio is between 1.8 and 2.2 while in one embodiment the transmittance ratio is between 1.9 and 2.1. In some embodiments the transmittance ratio is substantially 2, meaning that twice the intensity of incident light that is aligned with the polarization axis is allowed to pass through (e.g., 99.9 percent) as compared to the intensity of the incident light that is not aligned with the polarization axis and is allowed to pass through (e.g., 50 percent).

Optical filter 165 further includes second partially transmissive polarized filter 180 having a second polarization axis 220 that is oriented at 0 degrees as shown by coordinate system 215. Thus, second polarization axis 220 of second partially transmissive polarized filter 180 is rotated approximately 90 degrees in comparison to first polarization axis 210 of first partially transmissive polarized filter 175. In some embodiments second polarization axis 220 is rotated between 80 degrees and 110 degrees relative to first polarization axis 210. In further embodiments second polarization axis 220 is rotated between 85 degrees and 95 degrees relative to first polarization axis 210.

Second partially transmissive polarized filter 180 can have similar transmittance characteristics as first partially transmissive polarized filter 175. More specifically, in some embodiments second partially transmissive filter 180 allows light signals having an electric field aligned with second polarization axis 220 to pass through with at least 90 percent transmittance (e.g., with less than 10 percent attenuation) and in some embodiments with at least 95 percent transmittance and in one embodiment with at least 99 percent transmittance. In some embodiments, second partially transmissive polarized filter 180 allows light signals having an electric field not aligned with second polarization axis 220 to pass through with between 20 percent to 80 percent transmittance (e.g., with between 80 percent to 20 percent attenuation, respectively) and in some embodiments with between 40 percent to 70 percent transmittance and in one embodiment with between 45 percent to 55 percent transmittance. Thus, second partially transmissive filter 180 has a higher transmittance for on-axis light than it does for off-axis light.

In some embodiments optical filter 165 can also include one or more bandpass filters 225 and or focusing lenses 230 that can be positioned at any location within optical filter 165. In some embodiments optical detector 170 can be a pyrometer, photodiode, spectrometer, high or low speed camera operating in visible, ultraviolet, or IR spectral ranges, etc.

In further embodiments optical filter 165 can be made from a single polarized optical filter. More specifically, one filter element can have both a first polarization axis and a second polarization axis that is oriented approximately 90 degrees relative to the first polarization axis. The filter element can have similar ranges of transmissivity described above for on-axis and off axis light signals, thus a single filter element can perform the same dual polarization filtering functions describe above and as performed by first and second partially transmissive polarized filters 175, 180, respectively.

Figure 3:
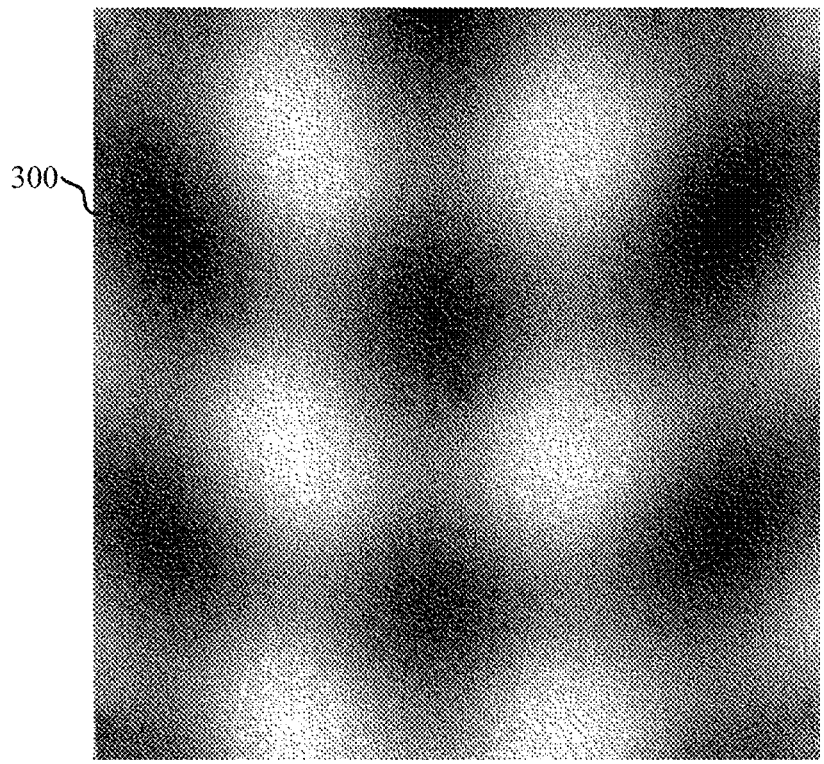
FIG. 3 is an image from an optical sensor without pre-filtering using the dual polarization optical filter described in FIGS. 1 and 2.
Figure 4:
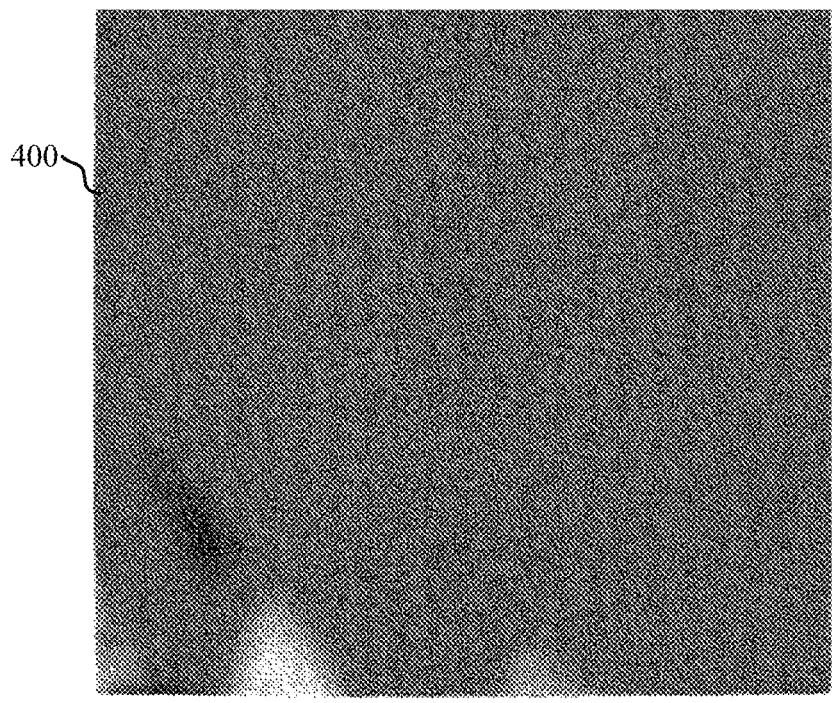
FIG. 4 is an image from an optical sensor with pre-filtering using the dual polarization optical filter described in FIGS. 1 and 2.

FIG. 3 illustrates an example image 300 from optical detector 170 (see FIGS. 1, 2) without first and second partially transmissive polarized filters 175, 180, respectively. As shown in FIG. 3 image 300 has a high degree of variation including an interference pattern indicating that signals of differing phase are collected by optical detector 170. Thus, the SNR of FIG. 3 is relatively low (e.g., a low signal strength compared to the noise floor) and it can be difficult to accurately ascertain the conditions at work region 125 (see FIG. 1). In contrast, FIG. 4 illustrates example image 400 from optical detector 170 with first and second partially transmissive polarized filters 175, 180, respectively. As shown in FIG. 4 image 400 is relatively uniform and the interference pattern is not apparent. Thus the SNR of FIG. 4 is significantly improved (e.g., a high signal strength compared to the noise floor) and the conditions at work region 125 (see FIG. 1) can be more accurately ascertained. In some embodiments employing optical filter 165 improves the SNR by a factor of 100:1 through the elimination of undesirable interference patterns and the attenuation of optical noise. The improved SNR enables the detection of micron-size defects in each affected layer of a build.

Figure 5:
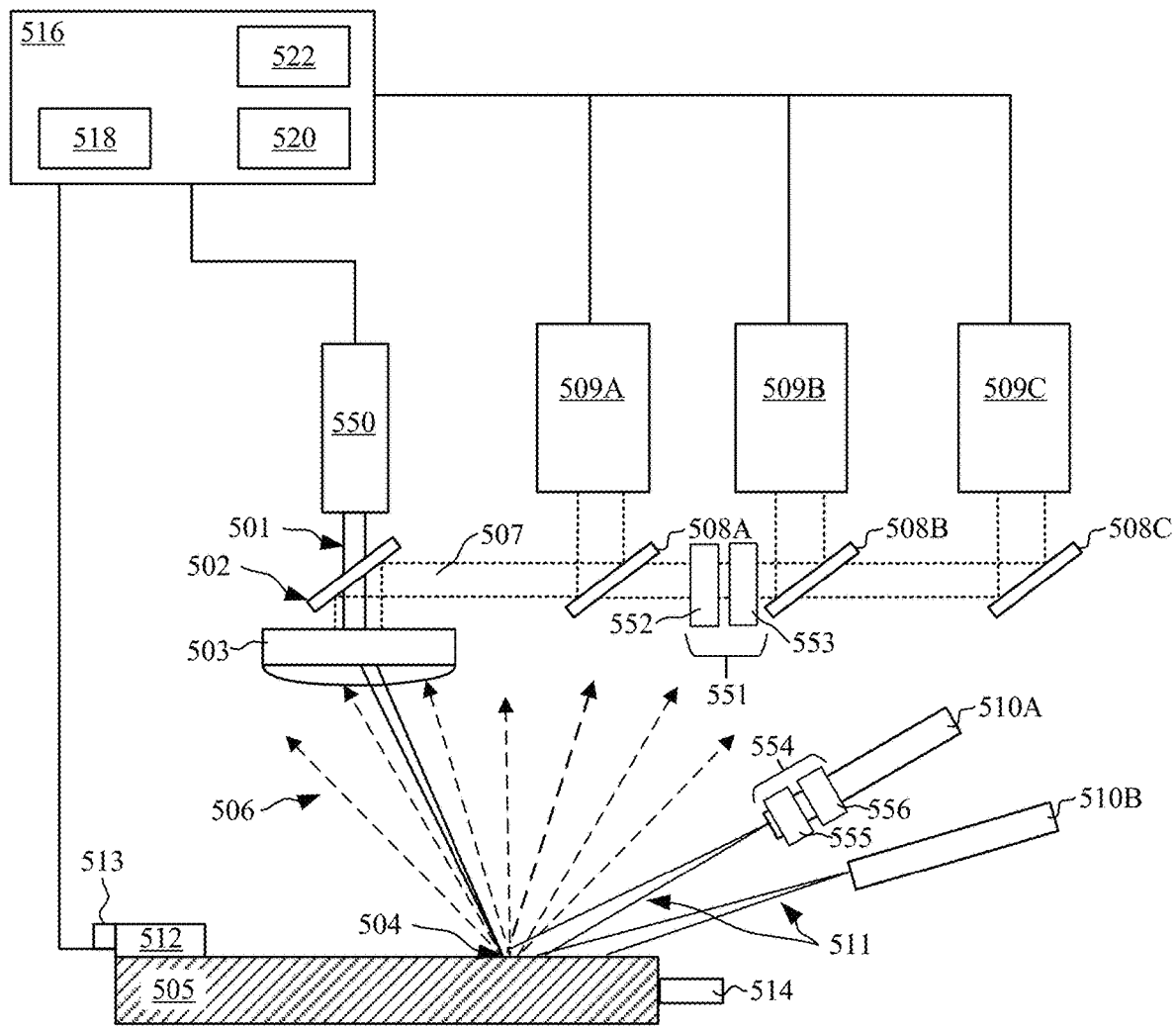
FIG. 5 is a simplified side view of an additive manufacturing system that includes a dual polarization optical filter employed on both on-axis and off-axis optical sensors, according to an embodiment of the disclosure.

FIG. 5 illustrates an example additive manufacturing system 500, according to embodiments of the disclosure. As shown in FIG. 5, additive manufacturing system 500 is similar to additive manufacturing system 100 shown in FIG. 1, however additive manufacturing system 500 employs multiple on-axis and multiple off-axis sensors that can receive light signals through one or more dual polarization optical filters, as described in more detail below.

Laser 550 emits a laser beam 501 that passes through a partially reflective mirror 502 and enters a scanning and focusing system 503 which then projects the beam to a work region 504 on work platform 505. In some embodiments, work platform 505 is a powder bed. Optical energy 506 is emitted from work region 504 due to the high material temperatures.

In some embodiments, scanning and focusing system 503 can be configured to collect some of optical energy 506 emitted from beam interaction region 504. Partially reflective mirror 502 can reflect optical energy 506 as depicted by optical signal 507. Optical signal 507 may be interrogated by multiple on-axis optical sensors 509A-509C each receiving a portion of the optical signal through a series of additional partially reflective mirrors 508. In some embodiments, additive manufacturing system may include only one on-axis optical sensor 509A with a fully reflective mirror 508A.

In some embodiments optical signal 507 may not have the same spectral content as optical energy 506 emitted from beam interaction region 504 because signal 507 has been attenuated and/or filtered by optical elements such as partially reflective mirror 502, scanning and focusing system 503, series of partially reflective mirrors 508 and dual polarization filter 551. Each optical element may have its own transmission and absorption characteristics. More specifically, optical sensor 509A may receive optical signal 507 filtered and/or attenuated by scanning and focusing system 503 and partially reflective mirror 502. Similarly, optical sensor 509B may receive optical signal 507 filtered and/or attenuated by scanning and focusing system 503, partially reflective mirror 502 and dual polarization optical filter 551. In some embodiments dual polarization optical filter 551 includes a first partially transmissive filter 552 having a first polarization axis and a second partially transmissive filter 553 having a second polarization axis wherein the second polarization axis is rotationally offset from the first polarization axis. In some embodiments dual polarization optical filter 551 improves a SNR of optical sensors 509B. Similarly, in some embodiments dual optical polarization filter 551 can also improve a SNR of optical sensor 509C.

Examples of on-axis optical sensors 509A-509C include but are not limited to photo to electrical signal transducers (i.e. photodetectors) such as pyrometers and photodiodes. The optical sensors can also include spectrometers, and low or high speed cameras that operate in the visible, ultraviolet, or the infrared frequency spectrum. On-axis optical sensors 509A-509C are in a frame of reference that moves with beam 501, (i.e., they collect readings from all regions that are fused by the laser beam and are able to collect optical signals 507 from all regions of work platform 505 as the laser beam scans across the work platform). Because optical energy 506 collected by scanning and focusing system 503 travels a path that is near parallel to laser beam 501, sensors 509A-509C can be considered on-axis sensors.

In some embodiments, additive manufacturing system 500 can include off-axis sensors 510A, 510B that are in a stationary frame of reference with respect to laser beam 501. Off-axis sensors 510A, 510B have a given field of view 511 that in some embodiments can be relatively narrow or in other embodiments the field of view could encompass entire work platform 505. Examples of these sensors could include but are not limited to pyrometers, photodiodes, spectrometers, high or low speed cameras operating in visible, ultraviolet, or IR spectral ranges, etc. Off-axis sensors 510A, 510B, not aligned with the energy source, are considered off-axis sensors.

In some embodiments a dual polarization optical filter 554 can be employed to improve a SNR of one or more off-axis sensors 510A, 510B. In this particular embodiment dual polarization optical filter 554 can be positioned to filter incoming optical signal from field of view 511 that enters off-axis sensor 510A. In some embodiments dual polarization optical filter 554 includes a first partially transmissive filter 555 having a first polarization axis and a second partially transmissive filter 556 having a second polarization axis wherein the second polarization axis is rotationally offset from the first polarization axis by 90 degrees. In some embodiments dual polarization optical filter 554 improves a SNR of off-axis optical sensor 510A.

In some embodiments, off-axis sensors 510A, 510B could also be sensors that combine a series of physical measurement modalities such as a laser ultrasonic sensor which could actively excite or "ping" the deposit with one laser beam and then use a laser interferometer to measure the resultant ultrasonic waves or "ringing" of the structure in order to measure or predict mechanical properties or mechanical integrity of the deposit as it is being built. The laser ultrasonic sensor/interferometer system can be used to measure the elastic properties of the material, which can provide insight into, for example, the porosity of the material and other materials properties. Additionally, defect formation that results in material vibration can be measured using the laser ultrasonic/sensor interferometer system.

Additionally, additive manufacturing system 500 can include contact sensors 513 on the mechanical device, recoater arm 512, which spreads the metallic powder. These sensors could be accelerometers, vibration sensors, etc. Lastly, there could be other types of sensors 514. These could include contact sensors such as thermocouples to measure macro thermal fields or could include acoustic emission sensors which could detect cracking and other metallurgical phenomena occurring in the deposit as it is being built. These contact sensors can be utilized during the powder addition process to characterize the operation of the recoater arm 512. Data collected by the on-axis optical sensors 509A-509C and the off-axis sensors 510A, 510B can be used to detect process parameters associated with recoater arm 512. Accordingly, non-uniformities in the surface of the spread powder can be detected and addressed by the system. Rough surfaces resulting from variations in the powder spreading process can be characterized by contact sensors 513 in order to anticipate possible problem areas or non-uniformities in the resulting part.

In some embodiments, on-axis optical sensors 509A-509C, off-axis sensors 510A, 510B, contact sensors 513, and other sensors 514 can be configured to generate in-process raw sensor data. In other embodiments, on-axis optical sensors 509A-509C, off-axis optical sensors 510A, 510B, contact sensors 513, and other sensors 514 can be configured to process the data and generate reduced order sensor data.

In some embodiments, a computer 516, including a processor 518, computer readable medium 520, and an I/O interface 522, is provided and coupled to suitable system components of additive manufacturing system 500 in order to collect data from the various sensors. Data received by the computer 516 can include in-process raw sensor data and/or reduced order sensor data. The processor 518 can use in-process raw sensor data and/or reduced order sensor data to determine laser 550 power and control information, including coordinates in relation to the work platform 505. In other embodiments, the computer 516, including the processor 518, computer readable medium 520, and an I/O interface 522, can provide for control of the various system components. The computer 516 can send, receive, and monitor control information associated with the laser 550, the work platform 505, and the recoater arm 512 in order to control and adjust the respective process parameters for each component.

The processor 518 can be used to perform calculations using the data collected by the various sensors to generate in process quality metrics. In some embodiments, data generated by on-axis optical sensors 509, and/or the off-axis sensors 510 can be used to determine the thermal energy density during the build process. Control information associated with movement of the energy source across the build plane can be received by the processor. The processor can then use the control information to correlate data from on-axis optical sensor(s) 509A-509C and/or off-axis optical sensor(s) 510A, 510B with a corresponding location. This correlated data can then be combined to calculate thermal energy density. In some embodiments, the thermal energy density and/or other metrics can be used by the processor 518 to generate control signals for process parameters, for example, laser power, laser speed, hatch spacing, and other process parameters in response to the thermal energy density or other metrics falling outside of desired ranges. In this way, a problem that might otherwise ruin a production part can be ameliorated. In embodiments where multiple parts are being generated at once, prompt corrections to the process parameters in response to metrics falling outside desired ranges can prevent adjacent parts from receiving too much or too little energy from the energy source.

In some embodiments, the I/O interface 522 can be configured to transmit data collected to a remote location. The I/O interface can be configured to receive data from a remote location. The data received can include baseline datasets, historical data, post-process inspection data, and classifier data. The remote computing system can calculate in-process quality metrics using the data transmitted by the additive manufacturing system. The remote computing system can transmit information to the I/O interface 522 in response to particular in-process quality metrics.

In the case of an electron beam system, an electron beam gun generates an electron beam that is focused by an electromagnetic focusing system and is then deflected by the electromagnetic deflection system resulting in a finely focused and targeted electron beam. The electron beam creates a hot beam-material interaction zone on the workpiece. Optical energy is radiated from the workpiece similar to the laser-based systems described above in FIGS. 1-5. The optical energy can be collected by both on-axis and off-axis optical sensors as described above. One or more of the optical sensors can employ a dual polarization optical filter as described herein to improve the SNR of the respective optical sensor.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

Additionally, spatially relative terms, such as "bottom or "top" and the like can be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as a "bottom" surface can then be oriented "above" other elements or features. The device can be otherwise oriented (e.g., rotated 90 degrees or at other orientations) and the spatially relative descriptors used herein interpreted accordingly.

What is claimed is:

1. An additive manufacturing system comprising:
    a build plane;
    an energy source configured to direct energy onto a work region of the build plane;
    an optical detector configured to receive one or more optical signals from the work region; and
    an optical filter positioned between the work region and the optical detector, the optical filter including a first fixed partially transmissive polarized filter having a first polarization axis and a second fixed partially transmissive polarized filter having a second polarization axis wherein the first polarization axis is rotationally offset 90 degrees from the second polarization axis to attenuate polarized light, and wherein the first and second polarization axes are orthogonal to an optical axis of the first and second polarized filters.

2. The additive manufacturing system of claim 1 wherein:
    the first partially transmissive polarized filter allows the optical signals having an electric field not aligned with the first polarization axis to pass through with between 20 percent and 80 percent transmittance; and
    the second partially transmissive polarized filter allows the optical signals having an electric field not aligned with the second polarization axis to pass through with between 20 percent and 80 percent transmittance.

3. The additive manufacturing system of claim 1 wherein:
    the first partially transmissive polarized filter allows the optical signals having an electric field not aligned with the first polarization axis to pass through with between 45 percent and 55 percent transmittance; and
    the second partially transmissive polarized filter allows the optical signals having an electric field not aligned with the second polarization axis to pass through with between 45 percent and 55 percent transmittance.

4. The additive manufacturing system of claim 1 wherein the first and second partially transmissive polarized filters each have a transmittance ratio that is between 1.5 and 2.5.

5. An additive manufacturing method comprising:
    scanning an energy source along a first path traversing a layer of powder disposed on a build plane;
    receiving one or more optical signals from the build plane during the scanning;
    filtering the one or more optical signals sequentially using a first fixed polarized filter having a first polarization axis and a second fixed polarized filter having a second polarization axis wherein the first polarization axis is rotated 90 degrees relative to the second polarization axis, and wherein the first and second polarization axes are orthogonal to an optical axis of the first and second polarized filters; and
    analyzing the one or more optical signals after the filtering using an optical sensor.

6. The method of claim 5 wherein the first polarized filter allows between 40 percent and 70 percent of an incident intensity of the one or more optical signals to pass through that have a polarization direction that is not aligned with the first polarization axis.

7. The method of claim 5 wherein the first polarized filter has a transmittance ratio that is between 1.5 and 2.5.

8. The method of claim 5 wherein the second polarized filter allows between 40 percent and 70 percent of an incident intensity of the one or more optical signals to pass through that have a polarization direction that is not aligned with the second polarization axis.

9. The method of claim 5 wherein the second polarized filter has a transmittance ratio that is between 1.5 and 2.5.

10. The method of claim 5 further comprising selectively filtering the one or more optical signals with a bandpass filter before the filtering.

11. An optical system comprising:
    a receiving aperture configured to receive one or more optical signals;

an optical filter arranged to filter the one or more optical signals received through the receiving aperture, the optical filter including:

a first fixed polarized filter having a first polarization axis;

a second fixed polarized filter having a second polarization axis;

wherein the first polarization axis is rotationally offset 90 degrees from the second polarization axis;

wherein the first and second polarization axes are orthogonal to an optical axis of the first and second polarized filters; and wherein the first and the second polarization filters are arranged to sequentially filter the one or more received optical signals; and an optical sensor configured to generate one or more sensor readings in response to receiving the filtered one or more optical signals.

12. The optical system of claim 11 wherein the first polarized filter allows between 40 percent and 70 percent of an incident intensity of the one or more received optical signals to pass through that have a polarization direction that is not aligned with the first polarization axis.

13. The optical system of claim 11 wherein the first polarized filter has a transmittance ratio that is between 1.5 and 2.5.

14. The optical system of claim 11 wherein the second polarized filter allows between 40 percent and 70 percent of an incident intensity of the one or more received optical signals to pass through that have a polarization direction that is not aligned with the second polarization axis.

15. The optical system of claim 11 wherein the second polarized filter has a transmittance ratio that is between 1.5 and 2.5.

16. The optical system of claim 11 wherein the optical filter further comprises a bandpass filter.

\* \* \* \* \*